UNITED STATES PATENT OFFICE.

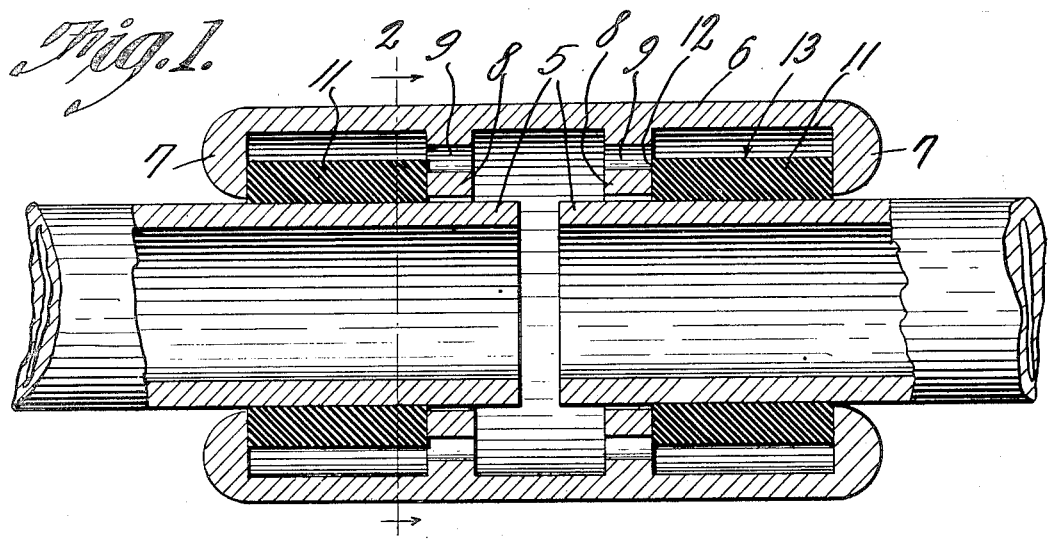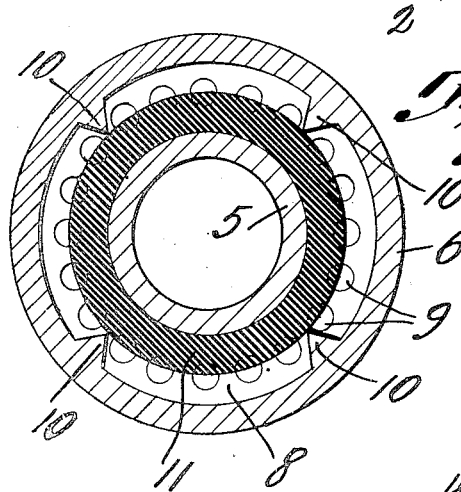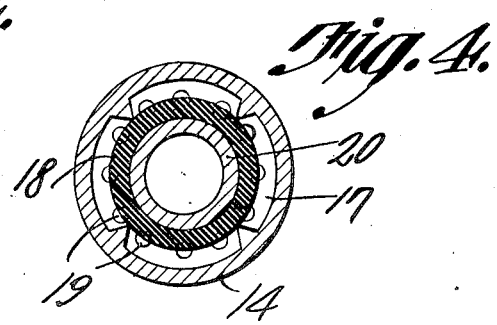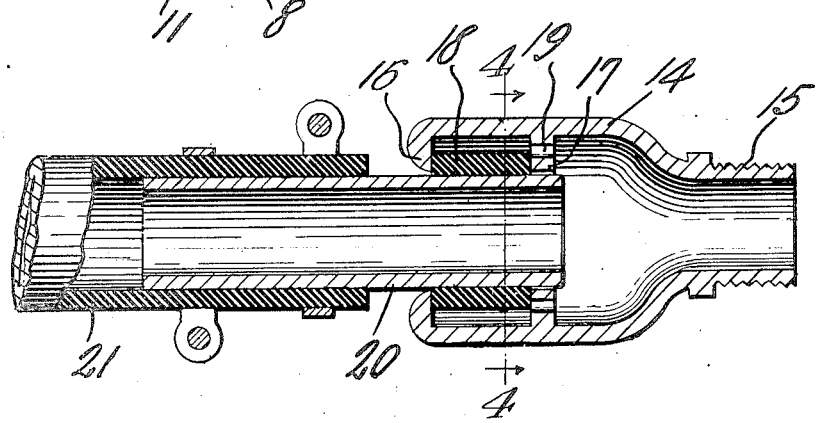

FITZ JAMES LEWIS, OF EMPIRE, CANAL ZONE.

PIPE-COUPLING.

1,107,327.   Specification of Letters Patent.   Patented Aug. 18, 1914.

Application filed October 21, 1913.   Serial No. 796,480.

*To all whom it may concern:*

Be it known that I, FITZ J. LEWIS, a citizen of the United States, residing at Empire, Canal Zone, Panama, have invented a new and useful Pipe-Coupling, of which the following is a specification.

This invention relates to an improved form of pipe coupling and more particularly to a pipe coupling which will engage and effect a liquid-tight joint with the outer surface of a pipe and without requiring that the pipe be threaded.

A further object is to provide a coupling which will engage the outer surface of a pipe and the greater the pressure to which the pipe is subjected, the greater will the coupling engage the pipe.

A further object is to provide a union which will flexibly engage a pipe so that a certain amount of play may be had between the union and the pipes which are secured thereto.

A further object is to provide a coupling or pipe attachment which may be used to stop leaks in pipes or to quickly mend a pipe if it becomes broken without necessitating that the pipes be removed or threaded.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated:

In said drawings:—Figure 1 is a view of two pipes and with my improved coupling illustrated in longitudinal section secured thereto. Fig. 2 is a cross sectional view thereof taken on the line 2—2 of Fig. 1. Fig. 3 is a longitudinal sectional view of a somewhat modified form of my improved pipe attachment or coupling. Fig. 4 is a cross sectional view on the line 4—4 of Fig. 3.

Referring to the drawings in which similar reference numerals designate corresponding parts throughout the several views, 5 are the meeting ends of two pipes between which a union is to be effected. A casing 6 of cylindrical form is provided of a diameter in excess of the external diameter of the pipes 5 to which it is to be attached. The casing 6 is provided at its ends with the downwardly extending annular flanges 7 and with the two inwardly extending rims 8. The rims 8 as will be apparent from a reference to Fig. 2, are provided with a plurality of apertures 9 extending therethrough the purpose of which will be more fully hereinafter pointed out. Extending between the flanges 7 and the adjacent rims 8 are the spacing ribs 10 which extend centrally but however, are not as long as the flanges 7 and rims 8. Located within the recesses defined by the flanges 7 and adjacent rims 8 are the gaskets 11 formed of some resilient or flexible material such as rubber or leather, and which are held out of contact with the walls of the casing 6 but central with respect thereto, by the spacing ribs 10, from which it will be apparent that pressure may pass through the apertures 9 and contact with the inner edge 12 and top 13 of the gaskets.

A somewhat different form of coupling member is illustrated in Figs. 3 and 4, but which, however, embodies the same principles whereby a liquid-tight joint is effected with the outer surface of a pipe. The somewhat modified form of the device comprises the casing 14 which is provided with a threaded portion 15 at one end. The remote end is provided with the inwardly extending flange 16 and similarly projecting rim 17 with a gasket 18 extending therebetween. The rim 17 is provided with the apertures 19 extending therethrough so that a similar action will take place as with the structures illustrated in Figs. 1 and 2. The pipe 20 is in the nature of a nipple to which the hose 21 may be secured by any convenient means.

In the practical use of my improved coupling, the pipes 5—5 are brought with their ends spaced a slight distance apart over which is passed the casing 6. If the pipes be already assembled and rigidly fixed at their opposite ends, the pipes will first be shifted and the casing passed over one, after which the pipes can again be brought into alinement and the casing returned so that it will span the joint between the two pipes as illustrated in Fig. 1. When pressure is now introduced within the pipes 5 it will make its way through the apertures 9 and down upon the top surfaces of the gaskets 13 so as to compress the same in forced contact with the surfaces of the pipes. The greater the pressure introduced, the more securely will the gaskets 13 engage the surfaces of the pipes and the more effectually will a tight joint be had therebetween. The natural tendency of the pipes to blow apart will insure that the gaskets 11 will be pressed into forced engagement with the inner surface of the flanges 7. Also attention is called to the fact that the rims 8 do not contact with the pipes 5 so that pressure will be had upon the edges 12 of the gasket which will also tend to force the same into contact with the flanges 7. Thus a quick and effective joint may be had between the meeting ends of a pipe and which joint may act as a plain coupling, or as a union and due to the fact that the flanges 7 and rims 8 do not contact at any point with the pipe, a certain flexibility will be had so that it is not absolutely essential that the pipes be held or brought into longitudinal alinement in order to effect a proper juncture therebetween, as is necessary with unions employing ground surfaces.

From the foregoing it will be apparent that should a pipe become broken it may be quickly mended by passing a coupling such as I have described over the fracture, the foregoing being true whether the fracture is of a minor nature or if the same extends entirely through the pipe and divides the same in two separate pieces.

Having thus fully described my invention, what I claim is:—

A pipe coupling and union comprising a casing, said casing provided with an inwardly extending flange at the end thereof, and with an inwardly extending apertured rim spaced a distance from said flange, a gasket extending between the said flange and rim and of relatively smaller internal diameter than the internal diameter of the rim or flange, said gasket adapted to receive a pipe therethrough and to snugly engage the same, said casing being provided with longitudinally extending spacing ribs extending between the said flange and rim holding the gasket in spaced relation with respect to the casing and the pipe in spaced relation and out of contact with the flange and rim, said rim aperture communicating with the space intermediate the outer periphery of the gasket and the inner surface of the casing, said pipe adapted to supply pressure behind the gasket and to one edge thereof, forcing the gasket into rigid contact with the pipe and the said flange.

In testimony that I claim the foregoing as my own, I have hereto affixed my signature in the presence of two witnesses.

FITZ JAMES LEWIS.

Witnesses:
Wm. D. Taylor,
H. Bartholomew.